(12) United States Patent
Carque

(10) Patent No.: US 8,627,910 B1
(45) Date of Patent: Jan. 14, 2014

(54) COLLAPSIBLE SMALL-SCALE ELECTRIC TRANSPORTATION SYSTEM

(76) Inventor: Tyler L. Carque, Boynton Beach, FL (US)

(*) Notice: Subject to any disclaimer, the term of this patent is extended or adjusted under 35 U.S.C. 154(b) by 105 days.

(21) Appl. No.: 13/403,161

(22) Filed: Feb. 23, 2012

(51) Int. Cl.
*B62K 15/00* (2006.01)

(52) U.S. Cl.
USPC .......................................... 180/65.1; 180/208

(58) Field of Classification Search
USPC .................. 180/65.1, 208, 907, 908; 280/641
See application file for complete search history.

(56) References Cited

U.S. PATENT DOCUMENTS

| | | | |
|---|---|---|---|
| 3,354,975 A | 11/1967 | Stuart | |
| 3,850,472 A | 11/1974 | Greppi | |
| 4,026,573 A | 5/1977 | Richardson | |
| 4,340,124 A | 7/1982 | Leonard | |
| D284,643 S | 7/1986 | Pankow | |
| 5,312,126 A * | 5/1994 | Shortt et al. | 280/287 |
| 6,749,039 B1 * | 6/2004 | Uphaus | 180/357 |
| 6,851,498 B1 | 2/2005 | Sauve | |
| 7,007,975 B2 * | 3/2006 | Taylor et al. | 280/781 |
| 7,278,507 B2 | 10/2007 | Walworth | |
| 7,621,358 B2 | 11/2009 | Pang | |
| 7,926,606 B2 * | 4/2011 | Wang | 180/208 |
| 7,967,095 B2 * | 6/2011 | Kosco et al. | 180/208 |
| 8,388,006 B2 * | 3/2013 | Wu et al. | 280/287 |
| 2007/0051548 A1 | 3/2007 | Kosco et al. | |
| 2009/0308676 A1 * | 12/2009 | Wang | 180/208 |

FOREIGN PATENT DOCUMENTS

JP 58206469 A * 12/1983 ............ B62D 33/02

* cited by examiner

*Primary Examiner* — Katy M Ebner

(57) ABSTRACT

A collapsible electric transportation system having a front half base and a back half base pivotally connected together via a hinge bracket, the half bases can fold about the hinge bracket in an extended position wherein the half bases create a platform structure and a storage position wherein top surfaces of the half bases are folded to face each other, motors, a seat panel pivotally attached atop the back half base panel, rear wheels and front wheels, a steering assembly adapted to control directions of the front wheels, a steering mechanism pivotally attached to the front half base which can pivot between at least an extended position at an angle with respect to the front half base and a storage position generally flush with the front half base, and a battery bank operatively connected to a motors.

10 Claims, 9 Drawing Sheets

Complete Battery Pack not shown for clarity

Batteries not shown for clarity

Detail of Sprocket Piece

COLLAPSIBLE SMALL-SCALE ELECTRIC TRANSPORTATION SYSTEM

FIELD OF THE INVENTION

The present invention is directed to electric vehicles and modes of transport, more particularly to a collapsible and small-scale electric system for transportation purposes.

BACKGROUND OF THE INVENTION

Many individuals choose alternative methods of transportation to cut down on traffic, for example bicycles, skateboards, scooters, and carpooling. The present invention features a small-scale collapsible electric transportation system. The system of the present invention is generally a one-seat vehicle that can fold in half for easy storage or transport (e.g., rolling). The system of the present invention helps reduce the amount of traffic on the roads. The system can be used by individuals of all ages, even young children.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a collapsible electric transportation system. In some embodiments, the system comprises a collapsible electric transportation system comprising a front half base and a back half, base pivotally connected together via a hinge bracket, the half bases can fold about the hinge bracket between at least an extended position wherein the half bases create a platform structure and a storage position wherein top surfaces of the half bases are folded to face each other; a motor engaged in the hinge bracket, a motor sprocket is operatively connected to the motor; a seat panel pivotally attached atop the back half base panel, the seat panel can move between at least an extended position at an angle with respect to the back half base and a storage position generally flush with the back half base panel, a first rear wheel and a second rear wheel connected by a rear axle; a first rear rail extending backwardly from a first side of the back half base, the first rear rail engages the first rear wheel, and a second rear rail extending backwardly from a second side of the back half base, the second rear rail engages the second rear wheel, wherein the rear rails are each connected to the back half base via cross rails, the cross rails are each pivotally connected to both the rear rails and the back half base allowing the rear rails to move toward the back half base to a storage position and away from the back half base to an extended position; a first front wheel and a second front wheel; a first front rail extending forwardly from a first side of the front half base, the first front rail engages the first front wheel, and a second front rail extending forwardly from second side of the front half base, the second front rail engages the second front wheel, wherein the front rails are each connected to the front half base via cross rails, the cross rails are each pivotally connected to both the front rails and the front half base allowing the front rails to move toward the front half base to a storage position and away from the front half base to an extended position; a steering assembly adapted to control directions of the front wheels, the steering assembly is connected to the first front wheel via a first wheel connecting arm and to the second front wheel via a second wheel connecting arm; a drive sprocket disposed on the rear axle and a belt drive that engages the drive sprocket and is operatively connected to the motor via the motor sprocket, the motor functions to rotate the belt drive via the motor sprocket thereby rotating the drive sprocket and rear axle; a steering mechanism pivotally attached to the front half base, the steering mechanism can pivot between at least an extended position at an angle with respect to the front half base and a storage position generally flush with the front half base, the steering mechanism is operatively connected to the steering assembly and allows a user to steer the front wheels; a throttle disposed on the steering mechanism, the throttle is operatively connected to the motor; and a battery operatively connected to the motor.

In some embodiments, the back half base comprises a top panel and a bottom panel separated by a gap and the front half base comprises a top panel and a bottom panel separated by a gap, wherein the hinge bracket is sandwiched between the top and bottom panels of both the front half base and the back half base.

In some embodiments, a wing is pivotally attached to a top edge of the seat panel, the wing can pivot upwardly or telescope upwardly to effectively increase a height of the seat panel. In some embodiments, the wheel connecting arms are connected to the front half base via one or more cables.

In some embodiments, the system further comprises a first rear turn signal light disposed on the first rear rail and a second rear turn signal light disposed on the second rear rail. In some embodiments, the system further comprises a first front turn signal light disposed on the first front rail and a second front turn signal light disposed on the second front rail. In some embodiments, the system further comprises a brake light disposed in the seat panel and visible from behind the seat panel.

In some embodiments, the system further comprises a handle disposed on the front half base. In some embodiments, the system further comprises a securing means for securing the half bases in the storage position. In some embodiments, the system further comprises a rain cover.

DESCRIPTION OF PREFERRED EMBODIMENTS

Figure 1:
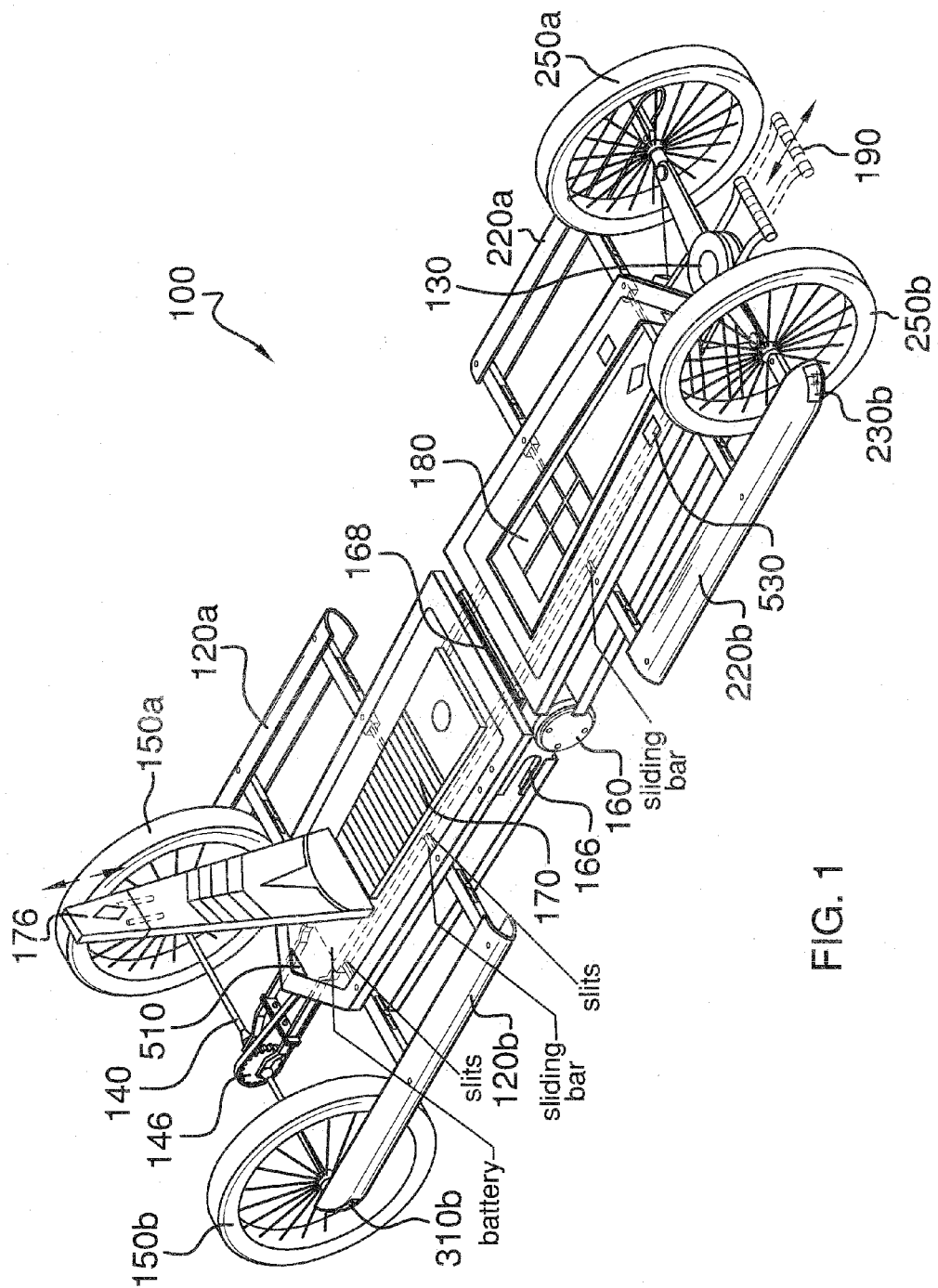
FIG. 1 is a perspective view of the system of the present invention.
Figure 2:
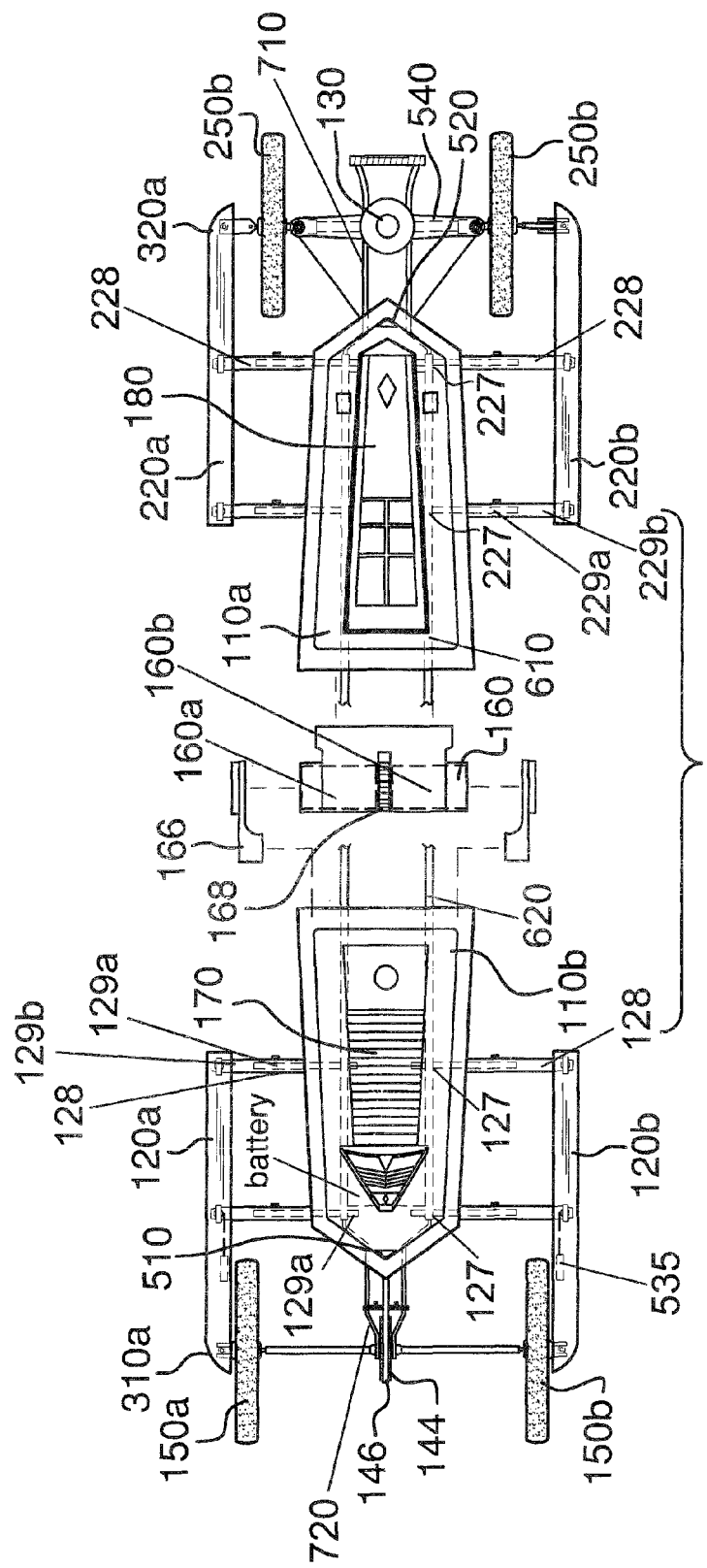
FIG. 2 is a top view of the system of the present invention.
Figure 4A:
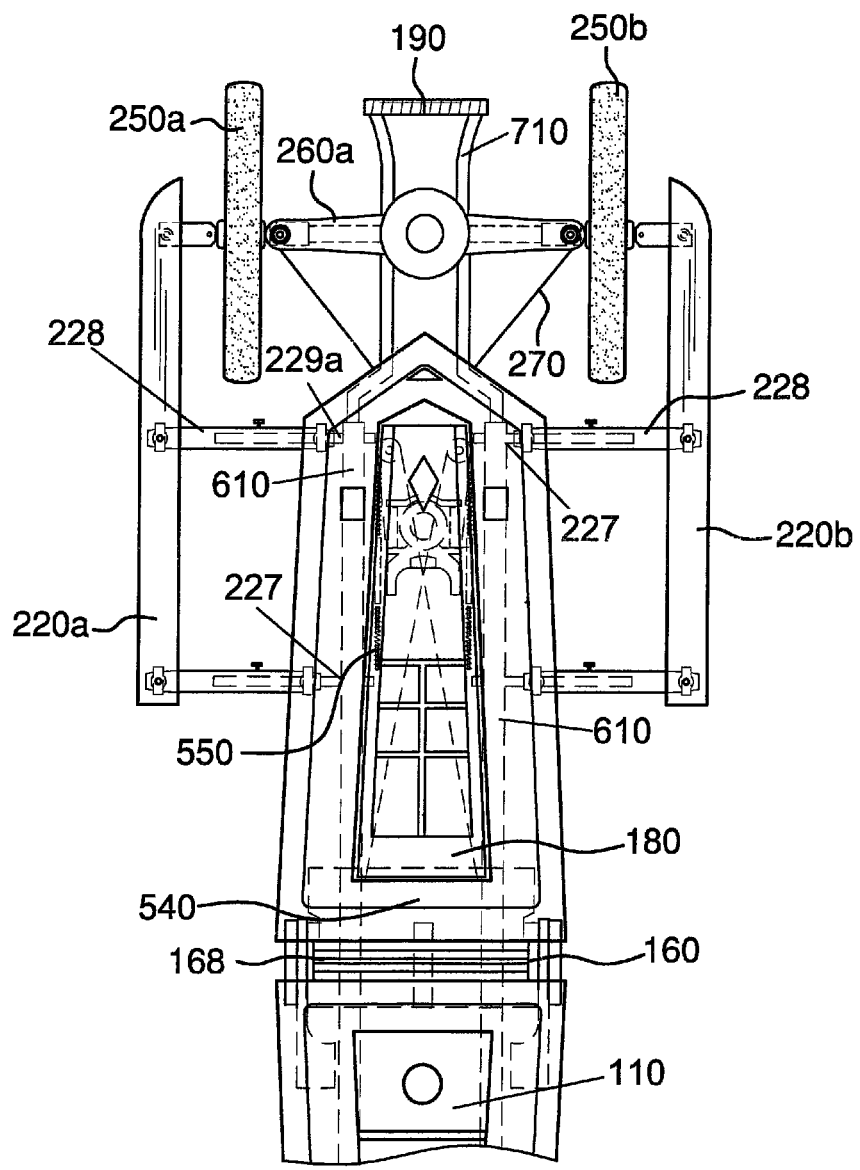
FIG. 4A is a detailed view of the system of the present invention.
Figure 4B:
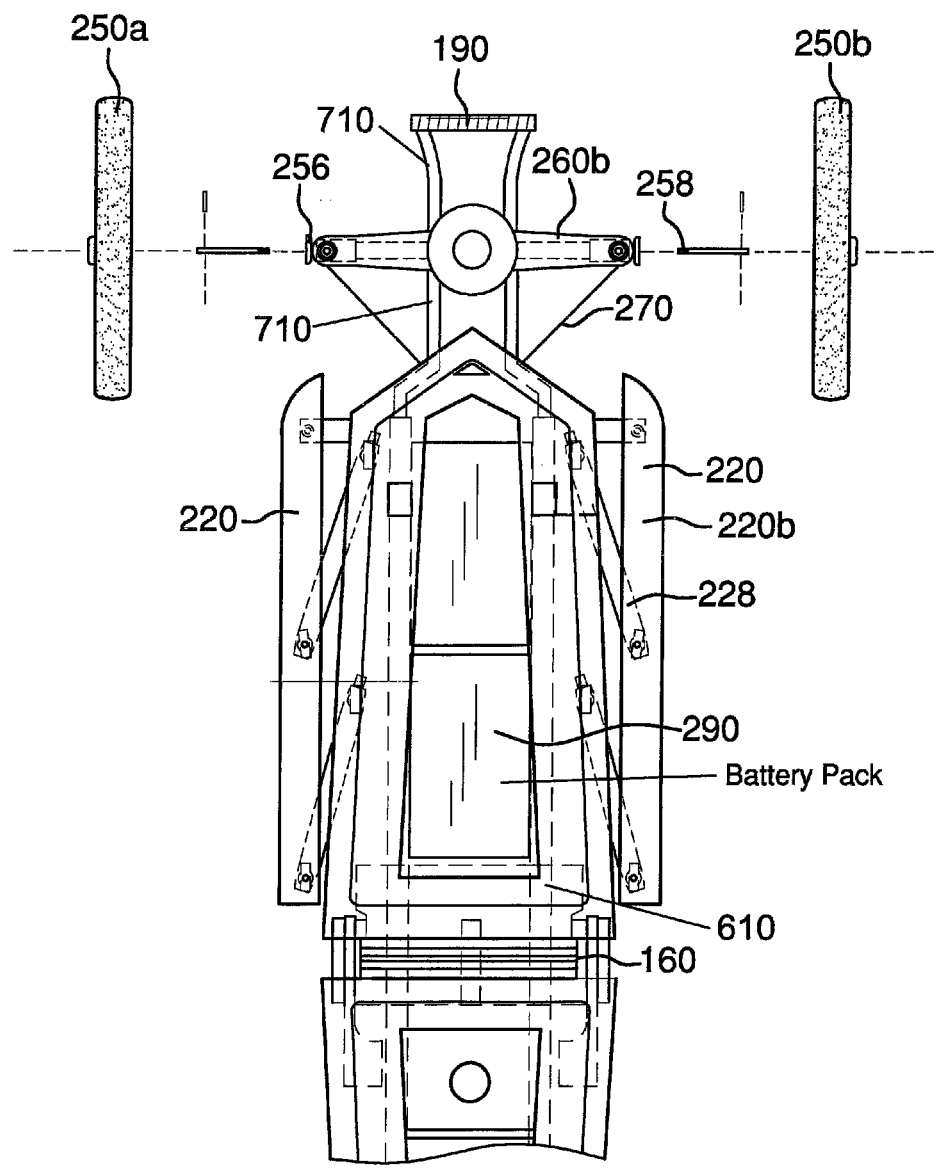
FIG. 4B is a detailed view of the system of the present invention.
Figure 5:
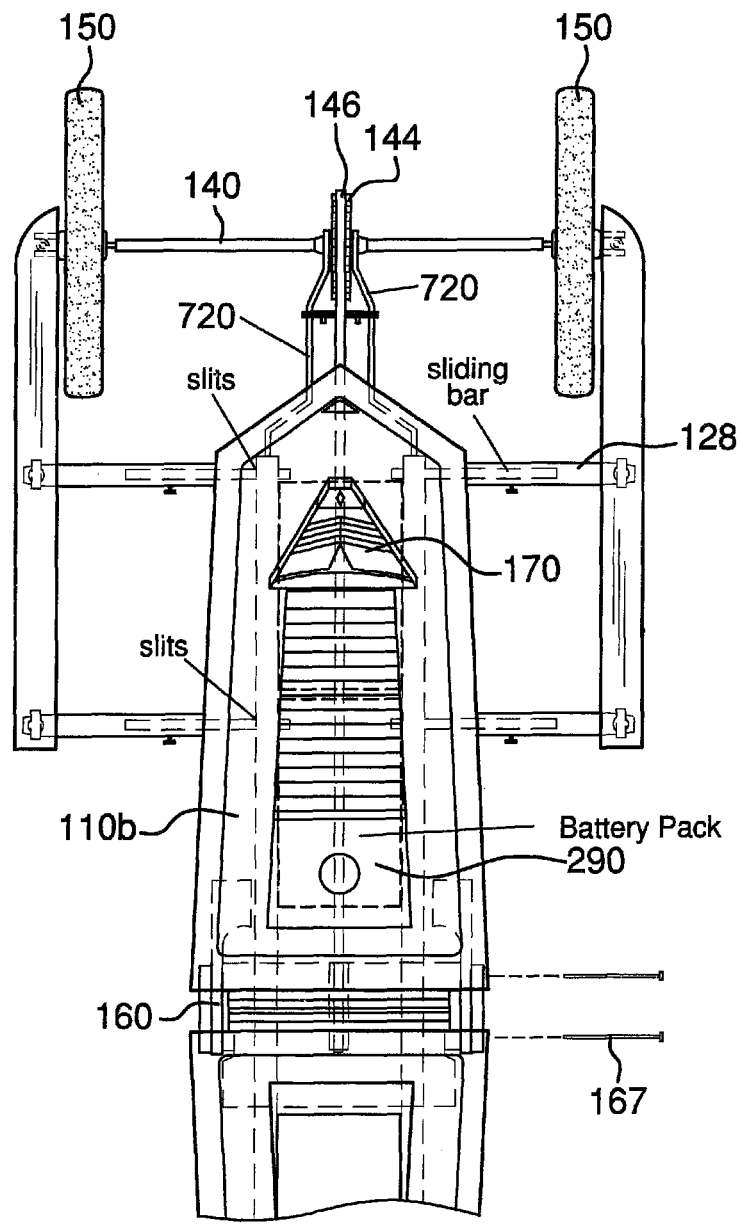
FIG. 5 is a detailed view of the system of the present invention.

Referring now to FIG. 1-7, the present invention features a collapsible electric transportation system 100. The collapsible electric transportation system 100 comprises a front half base 110*a* and a back half base 110*b* pivotally connected together (e.g., via a hinge bracket 166 or a pair of hinge brackets 166). The half bases 110 can fold (e.g., fold in half) about the hinge bracket 166. The hinge bracket 166 allows the half bases 110 to move between at least an extended position (e.g., see FIG. 3) and a storage position (e.g., see FIG. 6) and positions in between. In the storage position, the top surfaces of the half bases 110 are folded to face each other. The hinge bracket 166 (or hinge brackets 166) engages a motor 160 (or multiple motors 160a, 160b). FIG. 2 shows a detailed view of the system 100 of the present invention wherein the hinge bracket 166 is separate from the motors 160a, 160b. FIG. 5 shows a detailed view of the rear half base 110 wherein the motors 160a, 160b are engaged in the hinge bracket 166 via screws 167. A motor sprocket 168 is operatively connected to the motor(s) 160 (e.g., see FIG. 2).

Figure 3:
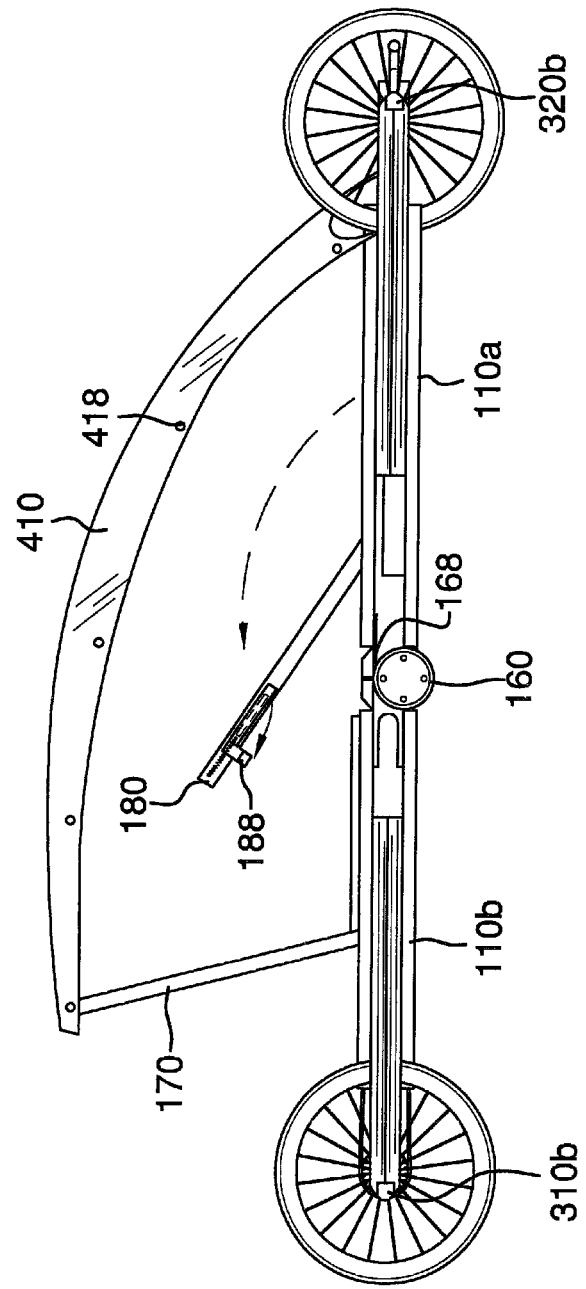
FIG. 3 is a side view of the system of the present invention.

In some embodiments, the back half base 110b comprises a top panel and a bottom panel separated by a gap and the front half base 110a comprises a top panel and a bottom panel separated by a gap, wherein the hinge brackets 166 are sandwiched between the top and bottom panels of both the front half base 110a and the back half base 110b (e.g., see FIG. 1, FIG. 3).

As shown in FIG. 1, the front half base 110a and the back half base 110b are separated by a gap but connected by the hinge bracket 166. The system 100 further comprises a stop bar 168 removably disposed in the gap in between the front half base 110a and the back half base 110b to temporarily prevent the half bases 110 from collapsing (e.g., when the system 100 is in use).

A seat panel 170 is disposed (e.g., pivotally attached) on the back half base panel 110b. In some embodiments, the seat panel 170 is extendable, e.g., a wing 176 is pivotally attached to the top edge of the seat panel 170, wherein the wing 176 can pivot upwardly or telescope upwardly to effectively increase the height of the seat panel 170. The seat panel 170 can pivot between an extended position (e.g., see FIG. 1) and a storage position wherein the seat panel 170 is generally flush with the back half base panel 110b. The seat panel 170 is not limited to a fold-down configuration.

The system 100 further comprises a pair of rear wheels 150 (e.g., a first rear wheel 150a, a second rear wheel 150b) connected by a rear axle 140. The rear wheels 150 can rotate about the rear axle 140 in a standard manner. The rear axle 140 is connected to the back half base 110b via rails 120. For example, a first rear rail 120a extends backwardly from a first side of the back half base 110b and engages the first rear wheel 150a and a second rear rail 120b extends backwardly from a second side of the back half base 110b and engages the second rear wheel 150b. In some embodiments, the rear wheels 150 are removable.

Figure 6:
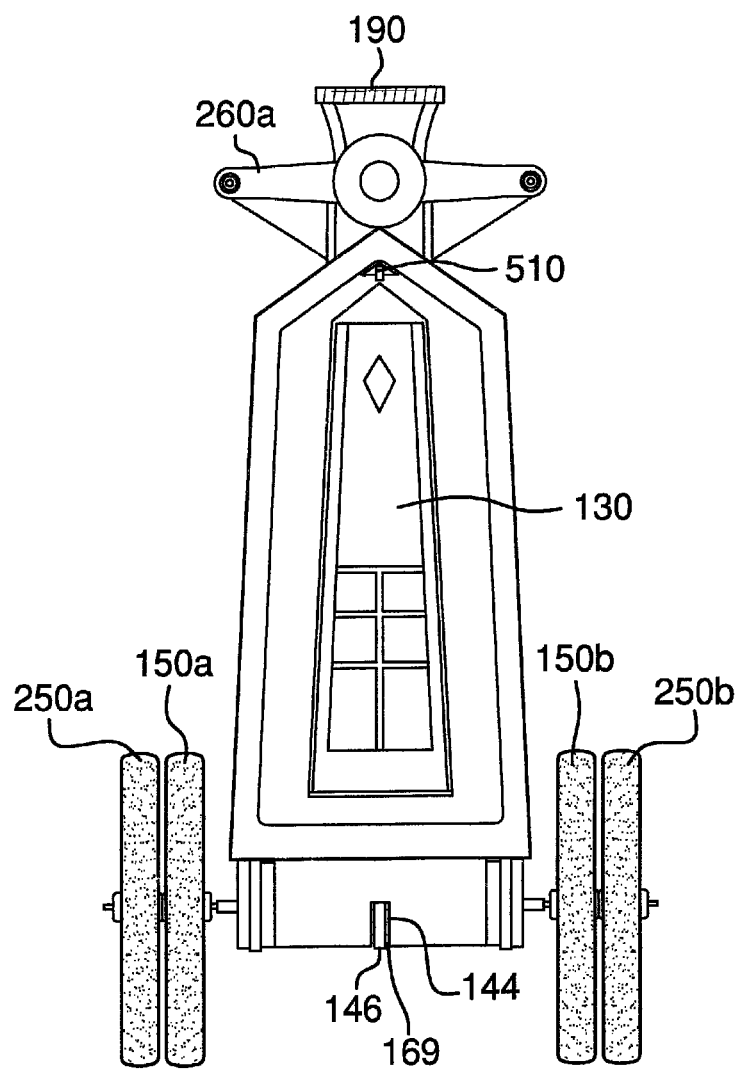
FIG. 6 is a folded view of the system of the present invention.

A drive sprocket 144 is disposed on the rear, axle 140. A belt drive 146 engages the sprocket. Drive sprockets and belt drives are well known to one of ordinary skill in the art. The belt drive 146 is operatively connected to the motor 160 (e.g., the motor sprocket 168). The motor 160 functions to rotate the belt drive 146 (e.g., via the motor sprocket 168), thereby rotating the drive sprocket 144 and rear axle 140. As shown in FIG. 6, a gap 169 is disposed in the hinge brackets 166 to allow for the motor sprocket 168 and the belt drive 146.

The system 100 further comprises a pair of front wheels 250 (e.g., a first front wheel 250a, a second front wheel 250b). A first front rail 220a extends forwardly from a first side of the front half base 110a and engages the first front wheel 250a and a second front rail 220b extends forwardly from a second side of the front half base 110a and engages the second front wheel 250b.

The system 100 further comprises a steering assembly 130 disposed on the front half base 110a (e.g., at the front edge or in front of the front half base 110a). Steering assemblies are well known to one of ordinary skill in the art. For example, the steering assembly controls the direction the front wheels 25n turn. The first front wheel 250a is connected to the steering assembly 130 via a first wheel connecting arm 260a and the second front wheel 250b is connected to the steering assembly 130 via a second wheel connecting arm 260b. In some embodiments, the wheel connecting arms 260 are connected to the front half base 110a via one or more cables 270.

In some embodiments, the front wheels 250 are removable (e.g., see FIG. 4B). As shown in FIG. 4B, the front wheels 250 may engage the respective wheel connecting arms 260 via threaded shafts 256 that engage threaded channels 258 disposed in the wheel connecting arms 260.

The system 100 further comprises a steering mechanism 180 (e.g., a steering wheel) operatively connected to the steering assembly 130. The steering mechanism 180 allows a user to steer the front wheels 250 by controlling the steering assembly 130. The steering mechanism 180 is pivotally attached to the front half base 110a (e.g., via a hinge). The steering mechanism 180 can pivot between at least an extended position (e.g., see FIG. 3) and a storage position wherein the steering mechanism 180 is generally flush with the front half base 110a. In some embodiments, the steering mechanism 180 comprises a pole track with spring 550 (e.g., see FIG. 4A). As shown in FIG. 3, the steering mechanism 180 pivots back toward the seat panel 170. The user grips the steering mechanism 180 from the seat panel 170. The steering mechanism 180 may comprise steering handles 188. In some embodiments, the steering handles 188 can fold into the steering mechanism 180 (e.g., for compact storage).

The throttle 540 is disposed on the steering mechanism 180. The throttle is operatively connected to the motor 160.

The system 100 further comprises a battery 290 (e.g., battery pack) operatively connected to the motor 160. In some embodiments, the battery 290 is housed in the front half housing 110a (e.g., see FIG. 4B). In some embodiments, the battery 290 is housed in the back half housing 110b (or in both). The battery pack may provide at least about 24 volts minimum, e.g., 48 volts or 200 amps.

As shown in FIG. 4A and FIG. 4B, in some embodiments, the front rails 220 are connected to the front half base 110a via cross rails 228. The cross rails 228 may be pivotally connected to both the front rails 220 and front half base 110a allowing the front rails 220 to move toward (to a storage position as shown in FIG. 4B) and away from the front half base 110a (to an extended position as shown in FIG. 4A). As shown in FIG. 5, in some embodiments, the rear rails 120 are connected to the back half base 110b via cross rails 128. The cross rails 128 may be pivotally connected to both the rear rails 120 and back half base 110b allowing the rear rails 120 to move toward (to a storage position) and away from the back half base 110b (to an extended position).

As shown in FIG. 2, in some embodiments, the cross rails 228 are sliding bars that slide inwardly and outwardly (e.g., toward and away from the front half base 110a). For example in some embodiments, the cross rails 228 can slide through a track bar slit on track bars. For example, in some embodiments, the cross rails 228 of the front half base 110a comprise an inner sliding bar 229a telescopically received in an outer shell bar 229b. In some embodiments, the inner sliding bar 229a is attached to a front track 610, e.g., in slits 227 disposed in the front track 610. In some embodiments, the outer shell bar 229b is attached to the front rails 220. The front track 610 may run along the length or a portion of the length of the front half base 110*a* as shown in FIG. 2.

As shown in FIG. 2, in some embodiments, the cross rails 128 are sliding bars that slide inwardly and outwardly (e.g., toward and away from the back half base 110*b*). For example, in some embodiments, the cross rails 128 can slide through a track bar slit on track bars. For example, in some embodiments, the cross rails 128 of the back half base 110*b* comprise an inner sliding bar 129*a* telescopically received in an outer shell bar 129*b*. In some embodiments, the inner sliding bar 129*a* is attached to a back track 620, e.g., in slits 127 disposed in the back track 620. In some embodiments, the outer shell bar 129*b* is attached to the rear rails 120. The back track 620 may run along the length or a portion of the length of the hark half hasp 110*b* as shown in FIG. 2.

A first rear turn signal light 310*a* is disposed on the first rear rail 120*a* and a second rear turn signal light 310*b* is disposed on the second rear rail 120*b*. A first front turn signal light 320*a* is disposed on the first front rail 220*a* and a second front turn signal light 320*b* is disposed on the second front rail 220*b*. A brake light 330 is disposed in the seat panel 170 (and is visible from behind the seat panel 170).

In some embodiments, a handle 190 is disposed on the front half base 110*a*. The handle 190 allows a user to easily roil behind or transport the system 100 (e.g., if desired or if electrical power runs out, etc.).

As shown in FIG. 2, FIG. 4A, FIG. 4B, FIG. 5, and FIG. 7, the system 100 comprises a front brace 710 that extends forwardly from the front track 610 and a back brace 720 that extends backwardly from the back track 620. In some embodiments, the handle 190 is disposed on the front or outer end of the front brace 710, as shown in FIG. 5, the back brace 720 engages the rear axle 140.

Figure 7:
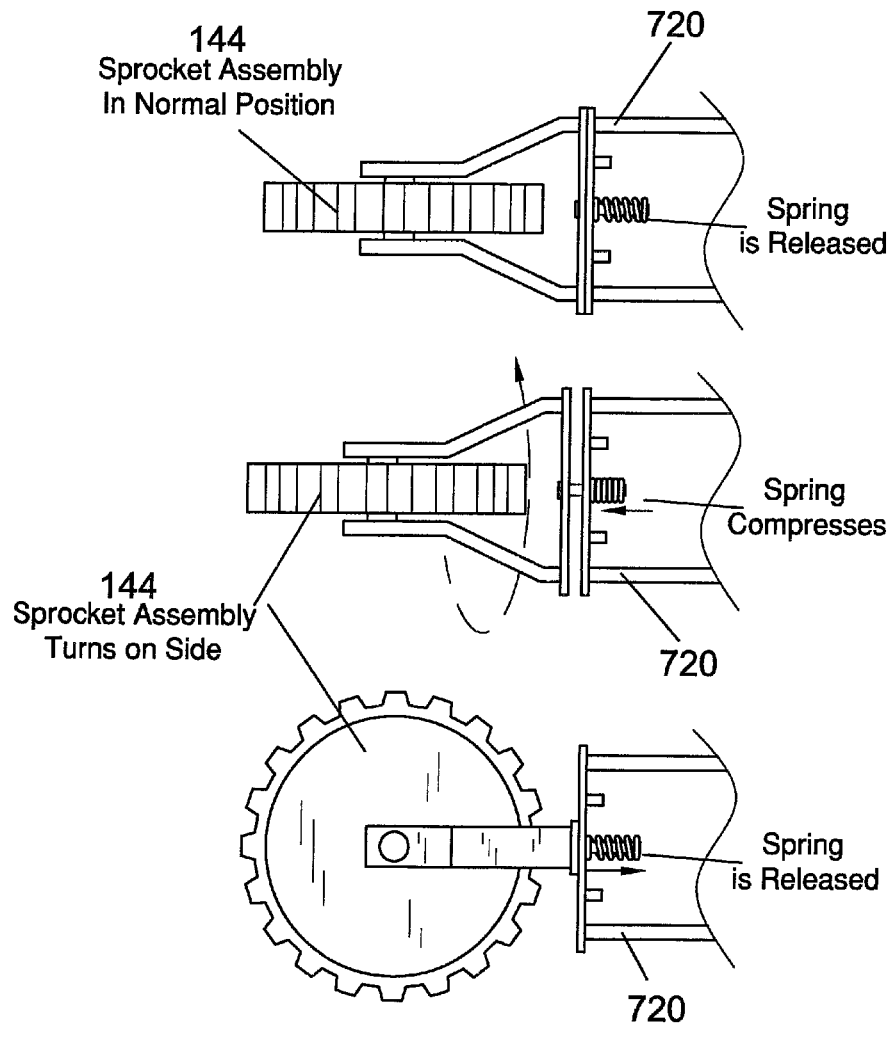
FIG. 7 is a detailed view of the system of the present invention.

As shown in FIG. 7, in some embodiments, the drive sprocket 144 is rotatable attached to the outer end of the back brace 720. For example, the drive sprocket 144 can be rotated in a first direction and/or a second direction with respect to the back brace 720. In some embodiments, the system 100 comprises a spring release, wherein the spring release when compressed rotates the drive sprocket with respect to the back brace 720 (see FIG. 7).

The system 100 can move between an extended position (e.g., see FIG. 3) and a storage position (e.g., see FIG. 6). The system 100 can be secured in the storage position via a securing means. In some embodiments, the securing means comprises a spring lock button 510 (e.g., disposed on the back half base 110*b*) that engages a lock 520 (e.g., disposed on the front half base 110*a*). The securing means is not limited to the examples described herein.

Figure 1A:
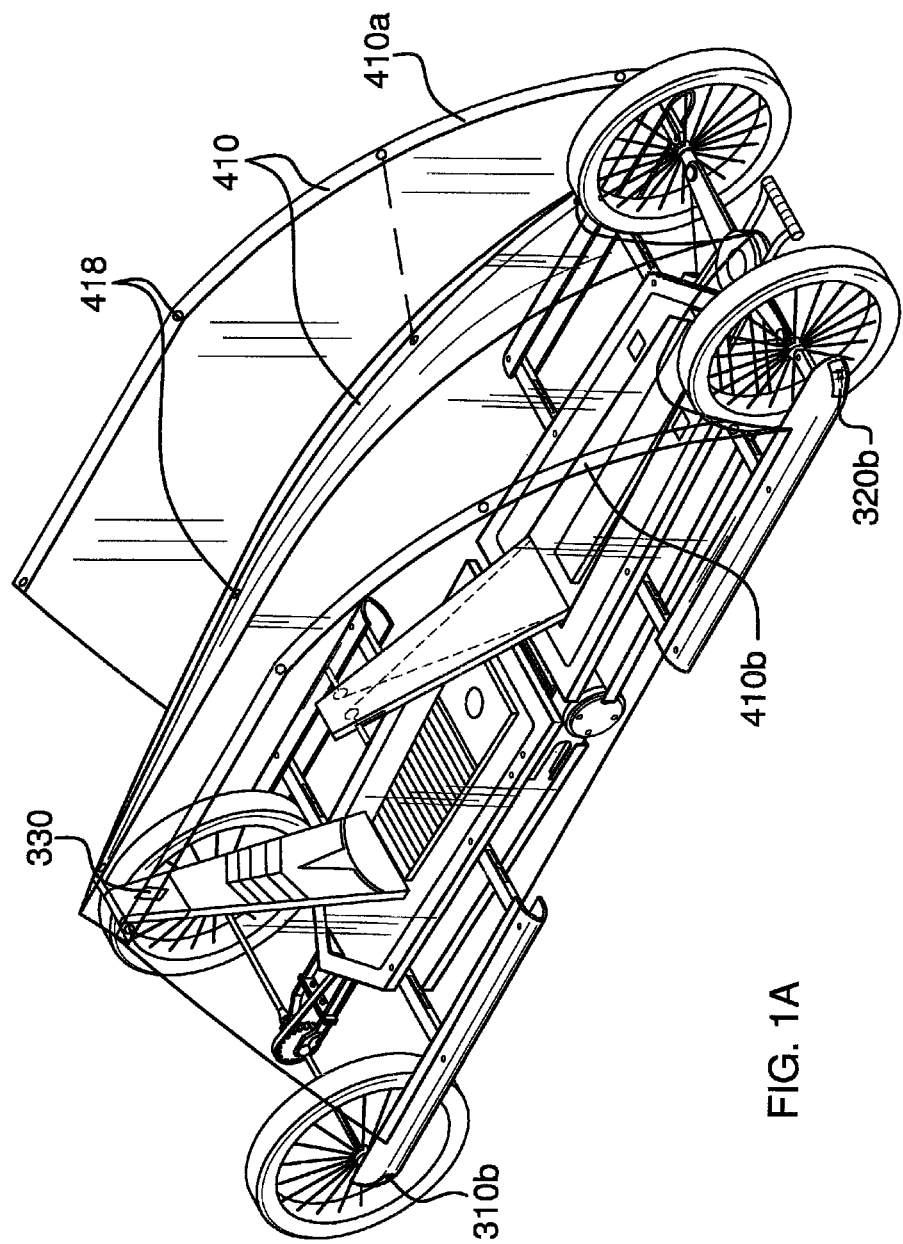
FIG. 1A is a perspective view of the system of the present invention.

As shown in FIG. 1A, in, some embodiments, the system 100 further comprises a rain cover 410 that can be removably attached (e.g., to the rear rails 120, the front rails 220, etc.) and can be configured to drape over the half bases 110 and the seat panel 170, steering mechanism 180, etc. The rain cover 410 may be constructed in a two-piece configuration as shown in FIG. 1A, wherein the first half rain cover 410*a* attaches to the first rear rail 120 and first front rail 220 and the second half rain cover 410*b* attaches to the second rear rail 120*b* and the second front rail 220*b*. The halves are connected via a connecting means (e.g., including but not limited to a magnet mechanism 418, a snap mechanism, etc.).

In some embodiments, the battery/batteries are lithium ion rechargeable batteries.

In some embodiments, the system 100 further comprises one or more of the following: speakers, a charging port, an audio jack for music, a radio, a cup holder, a mirror.

The system 100 further comprises a brake pedal 530. The brake pedal 530 is operatively connected to a brake component 535. In some embodiments, the brake component 535 is disposed on one or both of the rails 120*a*, 120*b* of the back half base (e.g., see FIG. 2). In some embodiments, a tube 540 is positioned below the wheel connecting arms 260 (e.g., see FIG. 2).

The disclosures of the following U.S. patents are incorporated in their entirety by reference herein: U.S. Pat. No. 7,621,358; U.S. Pat. No. 7,278,507; U.S. Pat. Application No, 2007/0051548; U.S. Pat. No. 3,850,472; U.S. Design Pat. No. D284,643; U.S. Pat. No. 4,026,573; U.S. Pat. No. 3,354,975; U.S. Pat. No. 6,851,498; U.S. Pat. No. 4,340,124.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A collapsible electric transportation system comprising:
   (a) a front half base (110*a*) and a back half base (110*b*) pivotally connected together via a hinge bracket (166), the half bases (110) can fold about the hinge bracket (166) between at least an extended position wherein the half bases (110) create a platform structure and a storage position wherein top surfaces of the half bases (110) are folded to face each other;
   (b) at least one motor (160) engaged in the hinge bracket (166), a motor sprocket (168) is operatively connected to the motor (160);
   (c) a seat panel (170) pivotally attached atop the back half base panel (110*b*), the seat panel (170) can move between at least an extended position at an angle with respect to the back half base (110*b*) and a storage position generally flush with the back half base panel (110*b*);
   (d) a first rear wheel (150*a*) and a second rear wheel (150*b*) connected by a rear axle (140);
   (e) a first rear rail (120*a*) extending backwardly from a first side of the back half base (110*b*), the first rear rail (120*a*) engages the first rear wheel (150*a*), and a second rear rail (120*b*) extending backwardly from a second side of the back half base (110*b*), the second rear rail (120*b*) engages the second rear wheel (150*b*), wherein the rear rails (120*b*) are each connected to the back half base (110*b*) via cross rails (128), the cross rails (128) are each pivotally connected to both the rear rails (120*b*) and the back half base (110*b*) allowing the rear rails (120*b*) to move toward the back half base (110*b*) to a storage position and away from the back half base (110*b*) to an extended position;
   (f) A first front wheel (150*a*) and a second front wheel (250*b*);
   (g) a first front rail (220*a*) extending forwardly from a first side of the front half base (110*a*), the first front rail (220*a*) engages the first front wheel (250*a*), and a second front rail (220b) extending forwardly from a second side of the front half base (110a), the second front rail (220b) engages the second front wheel (250b), wherein the front rails (220) are each connected to the front half base (110a) via cross rails (228), the cross rails (228) are each pivotally connected to both the front rails (220a) and the front half base (110a) allowing the front rails (220a) to move toward the front half base (110a) to a storage position and away from the front half base (110a) to an extended position;

(h) a steering assembly (130) adapted to control directions of the front wheels (250), the steering assembly (130) is connected to the first front wheel (250a) via a first wheel connecting arm (260a) and to the second front wheel (250b) via a second wheel connecting arm (260b);

(i) a drive sprocket (144) disposed on the rear axle (140) and a belt drive (146) that engages the drive sprocket (144) and is operatively connected to the motor (160) via the motor sprocket (168), the motor (160) functions to rotate the belt drive (146) via the motor sprocket (168) thereby rotating the drive sprocket (144) and rear axle (140);

(j) a steering mechanism (180) pivotally attached to the front half base (110a), the steering mechanism (180) can pivot between at least an extended position at an angle with respect to the front half base (110a) and a storage position generally flush with the front half base (110a), the steering mechanism (180) is operatively connected to the steering assembly (130) and allows a user to steer the front wheels (250);

(k) a throttle (540) disposed on the steering mechanism (180), the throttle is operatively connected to the motor (160); and (l) at least one battery (290) operatively connected to the at least one motor (160).

2. The system (100) of claim 1, wherein the back half base (110b) comprises a top panel and a bottom panel separated by a gap and the front half base (110a) comprises a top panel and a bottom panel separated by a gap, wherein the hinge bracket (166) is sandwiched between the top and bottom panels of both the front half base (110a) and the back half base (110b).

3. The system (100) of claim 1, wherein a wing (176) is pivotally attached to a top edge of the seat panel (170), the wing (176) can pivot upwardly or telescope upwardly to effectively increase a height of the seat panel (170).

4. The system (100) of claim 1, wherein the wheel connecting arms (260) are connected to the front half base (110a) via one or more cables (270).

5. The system (100) of claim 1 further comprising a first rear turn signal light (310a) disposed on the first rear rail (120a) and a second rear turn signal light (310b) disposed on the second rear rail (120b).

6. The system (100) of claim 1 further comprising a first front turn signal light (320a) disposed on the first front rail (220a) and a second front turn signal light (320b) disposed on the second front rail (220b).

7. The system (100) of claim 1 further comprising a brake light (330) disposed in the seat panel (170) and visible from behind the seat panel (170).

8. The system (100) of claim 1 further comprising a handle (190) disposed on the front half base (110a).

9. The system (100) of claim 1 further comprising a securing means for securing the half bases (110) in the storage position.

10. The system (100) of claim 1 further comprising a rain cover (410).

* * * * *